INVENTOR.
HARRIS A. ROBINSON
BY F. A. Rechif
ATTORNEY

INVENTOR.
HARRIS A. ROBINSON
BY F. A. Rechif
ATTORNEY 2,875,337

OSCILLATOR CONTROL SYSTEM

Harris A. Robinson, Palmyra, N. J., assignor to Radio Corporation of America, a corporation of Delaware Application April 27, 1956, Serial No. 581,155
8 Claims. (Cl. 250—36)

This invention relates to an oscillator control system, and more particularly to a frequency control system for stabilizing and controlling the frequency of a master oscillator of the captive type.

This invention constitutes an improvement over my copending applications, Serial No. 257,148, filed November 19, 1951, now Patent No. 2,754,421, dated July 10, 1956, and Serial No. 584,103, filed May 10, 1956. In the first of these applications, there is disclosed a multichannel (44,000-channel) frequency generator of the captive oscillator type. Such a generator utilizes a plurality of cascaded mixers, to the first of which a sample of the captive oscillator output is fed and the last of which feeds its output into a phase discriminator, in which such output is compared with a stable reference frequency and the output of which in turn is used for locking in the master (captive) oscillator. Each save the last of the aforementioned mixers is also fed with a respective stable reference frequency wave derived by frequency division from a reference crystal. However, in the first of the aforementioned applications the reference frequency wave fed to the last mixer is derived from a selected pair of crystals which are separate from the reference crystal.

The second of the aforementioned applications simplifies the arrangement of the first application in that the extra crystals which provide heterodyning input to the last mixer are eliminated, all of the reference frequency waves fed to the respective mixers then being derived from a single reference crystal. This simplification is effected by utilizing, for feeding the last mixer of the cascade arrangement, a stabilized oscillator controlled by pulses derived from the single reference crystal. In said second application, these controlling pulses are generated by a pulse generator excited by a stable frequency wave obtained by frequency division from the single reference crystal.

An object of the present invention is to devise an improved frequency control system of enhanced stability for a multichannel oscillator of the captive type.

Another object is to devise a frequency control system employing a pulse generator, in which such pulse generator is used both to lock in an oscillator at a subharmonic of a reference frequency (thus in effect dividing down this reference frequency), and also to lock in another oscillator at a harmonic of the frequency of the first oscillator.

The objects of this invention are accomplished, briefly, in the following manner: for the frequency control of a multichannel master (captive) oscillator, a sample of the output of this oscillator is fed into the first of a plurality of mixers arranged in cascade. In order to provide a plurality of stable reference frequency waves, the output of a single crystal oscillator is fed through a series of frequency dividers. Each of the mixers save the last, in addition to the wave fed thereto from the preceding mixer or from the multichannel master oscillator, is supplied also with a wave which is harmonically related to and generated from a respective one of the stable reference frequency waves. For providing an additional reference frequency wave, another oscillator is utilized, and by means of a pulse-locking arrangement including a pulse generator excited by the output of this same oscillator, such oscillator is locked at a frequency which is a subharmonic of one of the reference frequency waves. By means of a pulse-locking arrangement including this same pulse generator, still another oscillator is locked at a frequency which is a harmonic of the additional reference frequency wave mentioned, and a wave representative of the output of this last oscillator is fed into the last of the plurality of cascaded mixers. The output of this last mixer is utilized (e. g., in a phase discriminator) as a wave representative of the output of the multichannel master oscillator.

A detailed description of the invention follows, taken in conjunction with the accompanying drawings, wherein.

Figure 1:
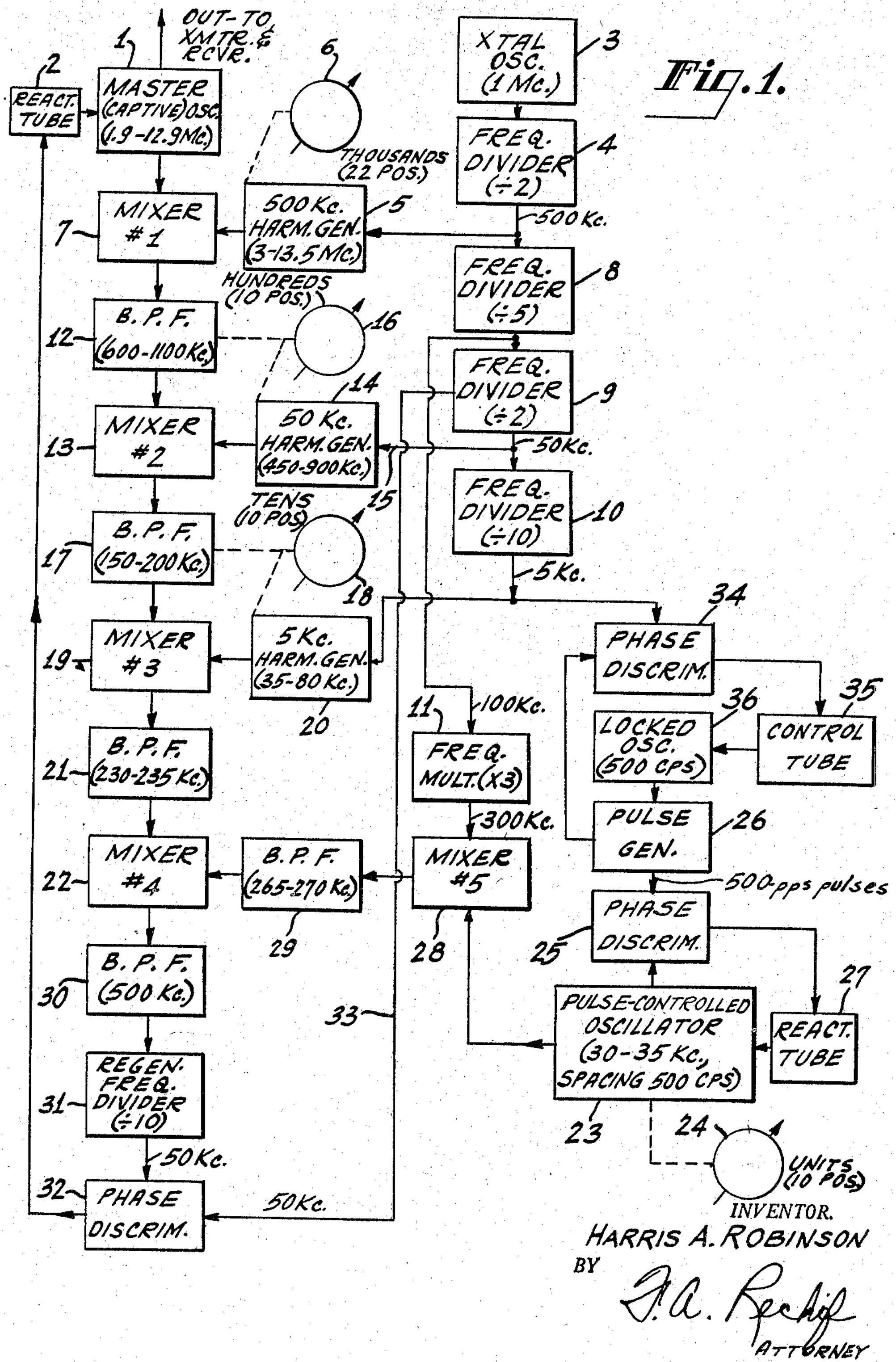
Fig. 1 is a block diagram of a system utilizing this invention.

Referring now to Fig. 1, the multichannel master (captive) oscillator 1 is the oscillator that is automatically controlled in frequency by the frequency control system illustrated in this figure, and the output of this oscillator is utilized in the transmitter-receiver (not shown) with which the system illustrated is associated. The transmitter-receiver may for example be arranged as disclosed in my aforesaid application Serial No. 257,148, now Patent No. 2,754,421 dated July 10, 1956. However, in Fig. 1 there is provided a choice of (only) 22,000 possible frequency channels, spaced 500 cycles apart in the range of 1.9 to 12.9 mc., for the oscillator 1. The master oscillator 1 is arranged to be permeability tuned and has an output frequency of 1.9 to 12.9 mc. (in several bands), as indicated. Exact frequency control of oscillator 1 is obtained by means of a reactance tube 2 coupled in frequency-controlling relation to oscillator 1.

A single very accurate and stable source of reference frequency waves is provided. The heart of the unit which provides these reference frequencies is a reference crystal-controlled oscillator 3 which operates at a frequency of one mc. and is extremely stable. Crystal 3 provides, by means of a series of cascaded frequency dividers, all of the stable reference frequency waves required. The first frequency divider 4 divides the frequency of oscillator 3 by two, to produce a stable reference frequency of 500 kc. which drives a 500-kc. harmonic generator 5. Generator 5 generates harmonics of the 500-kc. input frequency fed thereto. A "thousands" selection switch 6 has twenty-two positions and is mechanically coupled to a frequency selecting means in generator 5 so that any selected one of the 6th through 27th harmonics of the 500-kc. input to geneator 5 may be passed from said generator to No. 1 mixer 7, depending upon the position of switch 6. Any selected one of the 500-kc. harmonic frequencies between 3 and 13.5 mc. may be passed on to mixer 7. Thus, a reference frequency wave harmonically related to and generated from the 500-kc. reference frequency wave (output of divider 4) is fed from harmonic generator 5 into mixer 7. Mixer 7 is the first in a plurality of cascaded mixers.

Output from the master oscillator 1 is also supplied to the first mixer of the series of cascaded mixers and this oscillator frequency, beating with the output frequency of generator 5 in such mixer, produces a difference frequency mixer output which may vary from 600 to 1100 kc., depending upon the settings of the frequency selection switches 6 and 16.

The 500-kc. output of divider 4 in turn excites a further series of frequency dividers, beginning with a 100-kc. divider 8 the output of which drives a 50-kc. stage 9 whose output, in turn, drives a 5-kc. stage 10. The 50-kc. stage 9 includes amplifier and pulse shaper circuits whereby 50-kc. pulses and a 50-kc. sawtooth wave may be derived from this stage for utilization in circuits to be later described. In addition, a frequency multiplier 11 providing a multiplication factor of three is coupled to receive a portion of the output of divider 8, thereby to produce a reference frequency wave of 300 kc. for utilization in a circuit to be later described.

The 600–1100 kc. difference frequency output of mixer 7 is passed through a bandpass filter 12 to provide one of the inputs to No. 2 mixer 13 (the second in the plurality of cascaded mixers), the other input to this mixer being provided from a 50-kc. harmonic generator 14.

The generator 14 is supplied with 50-kc. pulse input derived from divider stage 9 over lead 15, and harmonics of this input frequency lying in the range of 450 to 900 kc. (to wit, the range covered by the 9th through 18th harmonics of the 50-kc. input frequency) are selected by the "hundreds" selection switch 16, which has ten positions. The particular harmonic of 50 kc. selected at the output of generator 14 depends of course upon the position of switch 16, and this selected harmonic is passed on to mixer 13 to mix with signal from filter 12 (mixer 7). Again, a reference frequency wave harmonically related to and generated from the 50-kc. reference frequency wave (output of divider 9) is fed from harmonic generator 14 into mixer 13. The selective circuit in filter 12 is tuned approximately by the "hundreds" switch 16.

Output from mixer 13 is transferred, through the selective circuit bandpass filter 17, tunable in ten steps between 150 and 200 kc. as the "tens" switch 18 (which has ten positions) determines, to No. 3 mixer 19 (the third in the plurality of cascaded mixers). A 5-kc. harmonic generator 20 is supplied with 5-kc. input derived from divider stage 10, and harmonics of this input frequency lying in the range of 35 to 80 kc. (to wit, the range covered by the 7th through16th harmonics of the 5-kc. input frequency) are selected by the "tens" switch 18. The particular harmonic of 5 kc. which is selected by switch 18 from generator 20 is passed on to mixer 19 as input to mix with signal from filter 17 (mixer 13). Again, a reference frequency wave harmonically related to and generated from the 5-kc. reference frequency wave (output of divider 10) is fed from harmonic generator 20 into mixer 19.

Output from mixer 19 is transferred through the bandpass filter 21, which passes a frequency band from 230 to 235 kc., to No. 4 mixer 22 (the fourth and last in the plurality of cascaded mixers).

The other input for mixer 22 is obtained in part from an oscillator 23, which is pulse-controlled in a manner to be described hereinafter to operate at any selected one of a plurality of discrete frequencies spaced apart 500 cycles, in the range of 30 to 35 kc. Oscillator 23 is tunable (switchable) by means of a "units" selection switch 24, which has ten positions, to tune it to any one of the various discrete frequencies (spaced 500 cycles apart) in the range of 30 to 35 kc. A portion of the output of oscillator 23 is fed as one input to a phase discriminator 25 having two inputs and a single output. The other input to discriminator 25 is obtained from a pulse generator 26, which supplies pulses occurring at a stable rate of 500 pulses per second (P. P. S.) to the discriminator. These pulses are locked to the reference crystal 3 in a manner to be described hereinafter. The 500-P. P. S. output of pulse generator 26 is fed as one input to phase discriminator 25, the other input to this discriminator being furnished by the pulse-controlled oscillator 23. The output of discriminator 25 is applied to a reactance tube 27 which is coupled in frequency-controlling relation to the pulse-controlled oscillator 23, whereby the output of discriminator 25 locks in the frequency of oscillator 23 by means of this reactance tube. In a manner to be described further hereinafter, using the phase discriminator 25 and reactance tube 27, the oscillator 23 is locked or synchronized to a selected harmonic of the 500-P. P. S. stable output of generator 26, so that this oscillator (which may thus be termed a pulse-controlled oscillator) provides an output of any selected one of a plurality of predetermined frequencies spaced 500 C. P. S. apart. This is true since oscillator 23 may be synchronized to a series of successive harmonics of the pulse recurrence rate of pulse generator 26 (which is 500 P. P. S.). Oscillator 23 is capable of being locked to any one of the 60th through 69th harmonics of the 500-P. P. S. output of pulse generator 26. Further details of the operation of oscillator 23 will not be given until later, so that the description of the over-all control system can now be completed.

Another portion of the output of oscillator 23 (in addition to that portion of the oscillator output fed to discriminator 25) is fed as one input to No. 5 mixer 28. In mixer 28, the output of oscillator 23 is mixed with a 300-kc. stable frequency wave from multiplier 11 to produce output from this last mixer of any one of ten frequencies, spaced every 500 cycles in the range from 265 to 270 kc. A bandpass filter 29 couples the output of mixer 28 to the last or No. 4 mixer 22.

The output of No. 4 mixer 22 is nominally 500 kc. In other words, as the master (captive) oscillator 1 is scanned through a band of frequencies there will be one segment of the oscillator tuning range, corresponding to the settings of the switches 6, 16, 18, and 24 (which determine the selected frequencies fed to the several mixers) where a signal near 500 kc. will be developed in the output of mixer 22; this signal output in the vicinity of 500 kc. corresponds closely to the desired correct tuning of the master oscillator 1. The 500-kc. output of mixer 22 is passed through a selective filter 30 (tuned to 500 kc.) to the input of a regenerative-type frequency divider 31 having a division ratio of ten. Frequency divider 29 divides the 500-kc. output of filter 30 (mixer 22) down to 50 kc., and this 50-kc. wave is coupled as one input to phase discriminator 32. A 50-kc. sawtooth-shaped output derived from divider stage 9 over lead 33 is supplied as the other input to phase discriminator 32. In the phase detector or discriminator 32, a D. C. control output results from the phase comparison of the 50-kc. signal from divider 31 and the 50-kc. sawtooth signal derived from the reference 50-kc. source 9. The control output of the phase discriminator 32 is direct coupled (preferably through a cathode follower stage, not shown) to the grid of the reactance tube 2 for the master oscillator 1, in order to correct for slow frequency drifts of the master oscillator 1.

The system described constitutes an automatic frequency control system for the master oscillator 1, by means of which the master oscillator is stabilized in frequency by a phase discriminator 28 which compares the heterodyned output of oscillator 1 (heterodyned through mixers 7, 13, 19 and 22) with the divided output of the reference crystal oscillator 3 (divided through dividers 4, 8, and 9). The arrangement described constitutes a multi-channel frequency generator, providing 22,000 channels for the master oscillator 1, one channel every 500 cycles in the frequency range extending from 1.9 to 12.9 mc. Each frequency channel is selected by the setting of the four switches 6, 16, 18, and 24.

According to this invention, certain frequency dividing stages (with their concomitant tubes and tuned transformers) which would ordinarily be required, have been eliminated. More particularly, the pulse-controlled oscillator 23 is required to generate ten frequency channels between 30 and 35 kc., the channels being spaced 500 kc. apart. Instead of using frequency divider stages for dividing the reference frequency, available at 5 kc. at the output of divider 10, to 500 cycles and then exciting the pulse generator 26 by this 500-cycle wave, an additional winding on the pulse transformer (which constitutes part of pulse generator 26) is provided, this additional winding feeding an additional phase discriminator 34. That is, one of the two inputs to phase discriminator 34 is provided by the 500-P. P. S. output of pulse generator 26. The other input to discriminator 34 is provided by the 5-kc. (reference frequency wave) output of frequency divider 10.

The output of phase discriminator 34 is fed to a frequency control tube 35 which is coupled in frequency-controlling relation to an auxiliary 500-C. P. S. oscillator 36, whereby the output of discriminator 34 locks in the frequency of oscillator 36 by means of this control tube. In a manner to be described further hereinafter, using the phase discriminator 34 and control tube 35, the oscillator 36 is locked or synchronized to a submultiple or subharmonic of the 5-kc. stable output of divider 10, and specifically to a frequency (500 C. P. S.) which is 1/10 of the 5-kc. frequency output of divider 10. Oscillator 36 (which may be termed a locked oscillator, since it is locked to a subharmonic of the 5-kc. frequency output of divider 10) has a stable frequency substantially sinusoidal output of 500 C. P. S., this output being coupled to the input of pulse generator 26 to provide the excitation therefor. Pulse generator 26 converts its substantially sinusoidal input wave to short, sharp pulses having the same periodicity or recurrence rate as the sine wave excitation, that is, having a recurrence rate of 500 P. P. S., one pulse being produced for each cycle of the 500-C. P. S. sine wave excitation. The control loop including elements 36, 26, 34, and 35 is a locked-oscillator type of frequency divider, which produces stable 550-P. P. S. pulses (at the output of pulse generator 26) from the 5-kc. stable reference frequency wave output of frequency divider 10.

It may be seen that the pulse generator 26 supplies 500-P. P. S. pulses to phase discriminator 34 (to enable the locking-in of oscillator 36) and also to phase discriminator 25 (to lock in or synchronize oscillator 23). Thus, the same pulse generator 26 is used for two functions—to divide the 5-kc. reference frequency and to control or lock in the 30–35 kc. oscillator 23.

Figure 2:
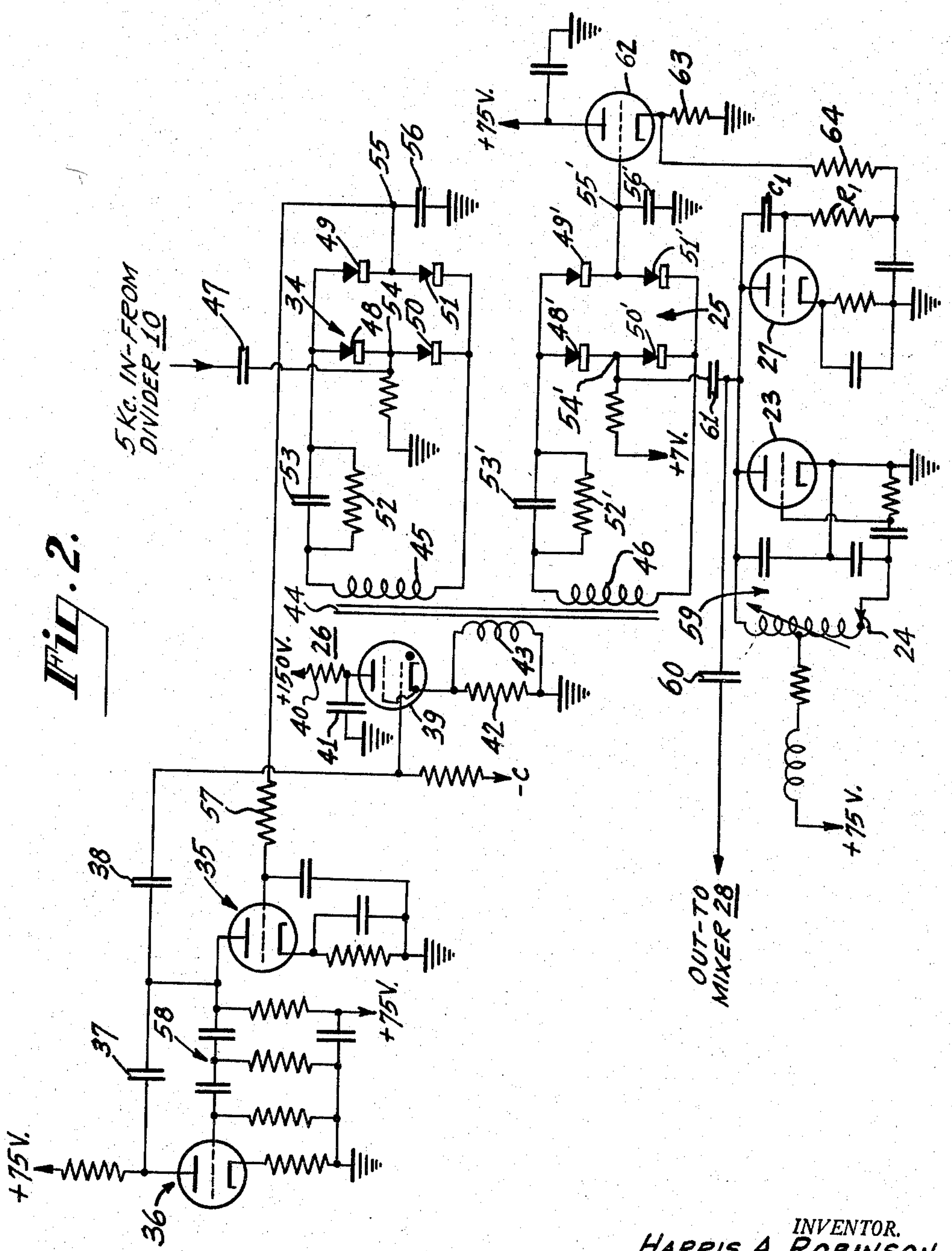
Fig. 2 is a detailed circuit digram of a portion of the system of Fig. 1.

Fig. 2 discloses detailed circuitry applicable to items 34, 35, 36, 26, 25, 27, and 23 of Fig. 1. In Fig. 2, the oscillator 36 includes a triode vacuum tube connected in a more or less conventional manner to operate as an RC-type oscillator whose output frequency is intended to be close to 500 C. P. S. and is substantially sinusoidal. The 500-C. P. S. sine wave output of oscillator 36 is applied through a pair of capacitors 37 and 38 to the first or control grid of a gas tetrode 39 which tertode is connected by means of a series resistor 40 and a capacitor 41 (in shunt across the anode-cathode path of tube 39) to provide a relaxation oscillator circuit. The time constant of the RC circuit 40, 41 (the charging circuit for capacitor 41) is a little faster than the periodicity of the 500-C. P. S. wave supplied to the control grid of tube 39, so that capacitor 41 becomes fully charged between positive excursions of the voltage applied to this grid. When the grid of tube 39 is driven positively, gas tetrode 39 fires to discharge capacitor 41 rapidly through tube 39, thus completing the sawtooth voltage wave which is initiated by the charging of the capacitor. The rapid discharge of capacitor 41 produces a short, sharp pulse of current through resistor 42 (which is connected from the cathode of tube 39 to ground), which pulse is applied to the primary winding 43 of a pulse transformer 44. The components 39—44 comprise the pulse generator 26. Since the capacitor 41 discharges each time the grid of tube 39 is driven positive (at a 500-cycle rate), pulses having a recurrence rate of 500 P. P. S. are produced in push-pull (that is, so as to have opposite polarities) at the two ends of each of the two secondary windings 45 and 46 of pulse transformer 44. The arrangement is such that positive pulses appear at the upper end of winding 45 and negative pulses at the lower end of this same winding; also, positive pulses appear at the upper end of winding 46 and negative pulses at the lower end of this same winding.

In order to provide a control loop for oscillator 36, so as to enable locking-in of such oscillator, a 5-kc. reference frequency wave from the output of frequency divider 10 is fed through a capacitor 47 to the phase discriminator 34, to which the ends of secondary winding 45 are also connected. The phase discriminator 34 comprises four rectifiers (for example, type 1N34A rectifiers) 48, 49, 50, and 51 connected in a bridge arrangement. The two inputs to the phase discriminator 34 are the 500-P. P. S. pulses (from pulse transformer 44, excited from oscillator 36) and the 5-kc. reference frequency wave (from divider 10) The 5-kc. reference frequency wave is derived ultimately from a highly stable reference crystal 3 and so does not vary. The anode-cathode paths of rectifiers 48 and 50 are connected in series across the secondary winding 45 (the connection to the upper end of winding 45 being made through a resistor 52 and a capacitor 53 connected in parallel), and the anode-cathode paths of the other two rectifiers 49 and 51 are connected in series, with this last series combination across the first diode series combination. Capacitor 47 feeds the 5-kc. reference frequency wave (output of divider 10) to the common junction 54 of the rectifier 48 cathode and the rectifier 50 anode. If desired, a suitable bias voltage may be applied to junction 54.

The output of phase discriminator 34 is taken from the common junction 55 of the rectifier 49 cathode and the rectifier 51 anode, and a storage capacitor 56 is connected from this point 55 to ground. Point 55 is also connected through a resistor 57 to the grid of a frequency control tube (triode vacuum tube) 35. The anode of tube 35 is connected to the anode of oscillator tube 36 through capacitor 37, and is also connected through an RC circuit 58 to the grid of tube 36. The anode-cathode path of tube 35 constitutes an equivalent resistance the extent of which depends, among other things, upon the mutual conductance of tube 35 and hence may be influenced by the voltage applied to its grid. Since this equivalent resistance is in the RC network of oscillator 36, the frequency of the output of this oscillator is influenced by the frequency control tube 35, as well as by the components of circuit 58.

If the two pulses of opposite polarity produced at the ends of secondary winding 45 are applied to the diodes, all four diodes will conduct simultaneously (since positive pulses are produced at the upper end of winding 45 and negative pulses are produced at the lower end of this winding), and their effects will cancel out at points 54 and 55.

Under static conditions of the phase discriminator 34 (with the substantially sinusoidal voltage output of divider 10 applied to the input of the diode bridge arrangement), the capacitor 56 (terminal 55 thereof) will charge to the D. C. voltage at point 54.

The condition existing when all four diodes are conducting is a short-circuit from point 54 to point 55. In other words, the diodes act as switches which connect point 54 to point 55 at the peaks of the pulses appearing in winding 45, since the four diodes are caused to conduct simultaneously when the pulses appear in secondary winding 45. Since the substantially sinusoidal voltage output of the divider 10 is applied to point 54, the instant the pulses are applied to the diodes some portion of this sinusoidal voltage wave will be sampled and applied to terminal 55 of the capacitor 56, charging the capacitor to this value. If the frequency of the sinusoidal alternating voltage output of divider 10 is a whole multiple of the rate of recurrence of the pulses, the same point of the sine wave will be sampled each time a pulse is applied for switching, and the capacitor 56 will hold a constant charge. The capacitance of capacitor 56 is sufficiently large that a practically ripple-free unidirectional control voltage occurs across such capacitor, and the amplitude of this depends upon the relative phasing of the pulses and the sinusoidal output of divider 10 (that is, upon the amplitude of the sinusoidal wave at the time of the pulses, when sampling occurs). If the relative phasing of the 500-P. P. S. pulses and the 5-kc. sinusoidal output of divider 10 is slightly changed, a different portion of the sinusoidal wave will be sampled and the capacitor 56 will charge or discharge through the short-circuit path from point 54 to point 55 (which path is established in the manner previously described, when all four diodes are caused to conduct simultaneously due to the effect of the pulses), to the new value. The average value of the unidirectional control voltage across capacitor 56 is obtained when the 500-P. P. S. pulses in winding 45 occur at exactly that moment when the 5-kc. sinusoidal alternating voltage output of divider 10 passes through zero. A very small deviation from this particular phasing causes a larger or smaller control voltage to be developed across capacitor 56.

The unidirectional control voltage across capacitor 56 is applied to the grid of the frequency control tube 35, to influence the frequency of oscillator 36. If the frequency or phase of oscillator 36 changes an amount which is not too large, the phasing of the pulses (developed from the output of oscillator 36) will change with respect to that of the sinusoidal voltage output of divider 10, causing the control voltage across capacitor 56 to be altered, and the variation in the oscillator frequency is compensated. Thus, the frequency of oscillator 36 remains equal to a submultiple or subharmonic of the frequency of the reference frequency wave applied to phase discriminator 34, and derived ultimately from the reference crystal 3 by way of divider 10. Oscillator 36 is thus controlled or locked in with respect to the 5-kc. reference frequency wave derived from divider 10, so as to lock in at a subharmonic or submultiple of such 5-kc. reference frequency wave. Specifically, oscillator 36 is locked in to operate at a frequency of 500 C. P. S., $\frac{1}{10}$ the frequency of the reference frequency wave.

If this synchronization of oscillator 36 by the 5-kc. reference frequency wave has not occurred at the moment of switching on, there will be a periodic variation of the voltage produced across capacitor 56; in other words, an alternating control voltage is obtained by which the oscillator voltage is frequency modulated. If, during this modulation, the oscillator frequency passes a value which is equal to a submultiple of the 5-kc. reference frequency, the oscillator frequency will remain at this value. For example, this last value may be 500 C. P. S.

To recapitulate, in my aforementioned application Serial No. 584,103, various pulse-locked or pulse-controlled oscillators are synchronized or controlled by impulse generators. It is possible also, however, to synchronize a pulse generator (or, actually, the oscillator feeding such a pulse generator) with a reference frequency wave derived from a crystal; this is what is done, according to this invention, for pulse generator 26 and oscillator 36. This is done by feeding the control voltage supplied by the phase discriminator 34 to control tube 35 which influences the frequency of the oscillator 36 (and pulse generator 26). The frequency of the locked oscillator 36 being lower than that of the 5-kc. reference frequency (out of divider 10), frequency division takes place in which the frequency ratio is the same as the multiplication factor in the said copending application.

The previous description has explained how the output of the pulse generator 26 (500-P. P. S. pulses) is used to enable the oscillator 36 to be locked in at a frequency which is a submultiple or subharmonic of the 5-kc. reference frequency wave output of divider 10. It will now be explained how the output of this same pulse generator 26 is used to lock in or synchronize oscillator 23 at a frequency which is a multiple or harmonic of the 500-P. P. S. output of pulse generator 26.

It has previously been described how positive 500-P. P. S. pulses appear at the upper end of winding 46 and negative 500-P. P. S. pulses appear at the lower end of this same winding.

A triode vacuum tube 23 with the LC oscillatory circuit 59 forms an oscillator. Tube 23 provides the pulse-controlled oscillator which is synchronized or locked to harmonics of the 500-P. P. S. pulses supplied by pulse generator 26 and appearing in the secondary winding 46. The frequency of the output of oscillator 23 is influenced by the reactance tube 27, as well as by the components of circuit 59.

The "units" switch 24 controls the frequency of oscillator 23 to set it close to any selected one of a plurality of frequencies which are harmonics of 500 C. P. S. and which lie between 30 and 35 kc. This frequency selection is accomplished in any suitable way, as by switching of a selected oscillatory circuit 59 into the oscillator.

An alternating voltage of the oscillator 23 frequency which leads in phase about 90° with respect to the alternating anode voltage, is supplied to the grid of tube 27 via the phase-shifting network $C_1$, $R_1$. This causes the anode current of tube 27 to be about 90° leading in phase with respect to the anode voltage, and the impedance of tube 27, between anode and cathode, will have a reactive character. The extent of the equivalent reactance depends, among other things, upon the mutual conductance of tube 27 and hence may be influenced by the voltage applied to its grid.

A portion of the output of the pulse-controlled oscillator 23 is taken off from the oscillatory circuit 59 and fed through a capacitor 60 to mixer 28, for mixing therein with the 300-kc. reference frequency wave and for later application to the last mixer 22 of the series of cascaded mixers.

In order to provide a control loop for the oscillator 23, to make this oscillator a pulse-controlled one, a sample of the oscillator output is taken off from the oscillatory circuit 59 and is fed through a capacitor 61 to the phase discriminator 25, to which the ends of the secondary winding 46 are also connected. The phase discriminator 25 comprises four rectifiers 48', 49', 50', and 51' arranged just as in discriminator 34 previously described and operating quite similarly. Elements of the phase discriminator 25 which are similar to those of phase discriminator 34 are denoted by the same reference numerals, but carrying prime designations. The two inputs to the phase discriminator 25 are the 500-P. P. S. pulses (from pulse transformer secondary winding 46) and the output of the oscillator 23.

Point 55' (the ungrounded plate of the capacitor 56') is connected to the grid of a triode vacuum tube 62 connected as a cathode follower, and the voltage across the cathode resistor 63 of this cathode follower circuit is applied to the grid of reactance tube 27 through resistors 64 and $R_1$.

Just as previously described in connection with phase discriminator 34, diodes 48', 49', 50', and 51' act as swtiches which connect point 54' to point 55' at the peaks of the pulses appearing in winding 46. Since the substantially sinusoidal voltage output of the oscillator 23 is applied to point 54', the instant the pulses are applied to the diodes some portion of this sinusoidal voltage wave will be sampled and applied to terminal 55' of the capacitor 56', charging the capacitor to this value. If the frequency of the sinusoidal alternating voltage output of oscillator 23 is a whole multiple of the rate of recurrence of the pulses, the same point of the sine wave will be sampled each time a pulse is applied for switching, and the capacitor 56' will hold a constant charge. The capacitance of capacitor 56' is sufficiently large that a practically ripple-free unidirectional control voltage occurs across such capacitor, and the amplitude of this depends upon the relative phasing of the pulses and the sinusoidal output of oscillator 23 (that is, upon the amplitude of the sinusoidal wave at the time of the pulses, when sampling occurs). If the relative phasing of the pulses and the sinusoidal output of oscillator 23 is slightly changed, a different portion of the sinusoidal wave will be sampled and the capacitor 56' will charge or discharge through the short-circuit path from point 54' to point 55', to the new value. The average value of the unidirectional control voltage across capacitor 56' is obtained when the pulses in winding 46 occur at exactly that moment when the sinusoidal alternating voltage output of oscillator 23 passes through zero. A very small deviation from this particular phasing causes a larger or smaller control voltage to be developed across capacitor 56'.

The unidirectional control voltage across capacitor 56' is applied to the grid of the D. C.-coupled cathode follower triode 62 and the D. C. output voltage appearing across cathode resistor 63 is applied to the grid of the reactance tube 27, to influence the frequency of oscillator 23. If the frequency or phase of oscillator 23 changes an amount which is not too large, the phasing of the sinusoidal voltage output of oscillator 23 will change with respect to that of the pulses, causing the control voltage across capacitor 56' to be altered, and the variation in the oscillator frequency is compensated. Thus, the frequency of oscillator 23 remains equal to a whole multiple of the recurrence frequency of the 500-P. P. S. pulses applied to phase discriminator 25, and derived from the locked oscillator 36. Oscillator 23 is thus controlled by the pulses derived from pulse generator 26, so that it may be locked or synchronized at various harmonics of the 500-P. P. S. recurrence frequency of the pulses provided by generator 26. These pulses are in turn developed from the stable frequency output of locked oscillator 36, as previously described.

If this synchronization of oscillator 23 by the pulses has not occurred at the moment of switching on, there will be a periodic variation of the voltage produced across capacitor 56'; in other words, an alternating control voltage is obtained by which the oscillator voltage is frequency modulated. If, during this modulation, the oscillator frequency passes a value which is equal to a whole multiple of the pulse frequency, the oscillator frequency will remain at this value.

Synchronization of the oscillator 23 may occur when the ratio between its frequency and the pulse recurrence frequency (500 P. P. S.) is a large integer. Synchronization up to the 70th harmonic of the pulse recurrence frequency (as given by way of example for oscillator 23, which is synchronized at as high as 35 kc. from a 500-P. P. S. pulse source) is easily achieved.

It may be seen that the pulse generator 26 supplies 500-P. P. S. pulses to phase discriminator 34 (to enable locking-in of oscillator 36 and consequent frequency division of the 5-kc. reference frequency wave from divider 10) and also to phase discriminator 25 (to lock in or synchronize oscillator 23 at a harmonic of the 500-P. P. S. pulse rate).

What is claimed is:

1. In a frequency control system for a multichannel oscillator, a single stable frequency source providing a plurality of reference frequency waves, *n* mixers arranged in cascade, where *n* is more than 1, means feeding a sample of the wave output of said oscillator into the first of said mixers, (*n*—1) means for feeding a reference frequency wave harmonically related to a respective one of said first-mentioned waves into each respective mixer save the last, means feeding the output of each respective mixer save the last to the input of the next successive mixer, a second oscillator, a pulse generator coupled to the output of said second oscillator for developing from such output a series of pulses having a recurrence frequency equal to the frequency of the second oscillator output, a first phase discriminator having two inputs and an output, means coupling the output of said pulse generator to one of said two inputs, means for applying one of said reference frequency waves to the other of said two inputs, means coupling the output of said first discriminator to a frequency-controlling device for said second oscillator, a third oscillator, a second phase discriminator having two inputs and an output, means coupling the output of said pulse generator to one of the inputs of said second discriminator, means coupling the output of said second discriminator to a frequency-controlling device for said third oscillator, means coupled to said third oscillator for feeding a wave representative of the output of said third oscillator into the last mixer, and means for utilizing the output of said last mixer as a wave representative of the output of said multichannel oscillator.

2. In a frequency control system for a multichannel oscillator, a single stable frequency source providing a plurality of reference frequency waves, *n* mixers arranged in cascade, where *n* is more than 1, means feeding a sample of the wave output of said oscillator into the first of said mixers, (*n*—1) means for feeding a reference frequency wave harmonically related to a respective one of said first-mentioned waves into each respective mixer save the last, means feeding the output of each respective mixer save the last to the input of the next successive mixer, a second oscillator, a pulse generator coupled to the output of said second oscillator for developing from such output a series of pulses having a recurrence frequency equal to the frequency of the second oscillator output, a first phase discriminator having two inputs and an output, means coupling the output of said pulse generator to one of said two inputs, means for applying one of said reference frequency waves to the other of said two inputs, means coupling the output of said first discriminator to a frequency-controlling device for said second oscillator, whreby said second oscillator is locked to a frequency harmonically related to that of said last-mentioned one reference frequency wave, a third oscillator, a second phase discriminator having two inputs and an output, means coupling the output of said pulse generator to one of the inputs of said second discriminator, means coupling the output of said third oscillator to the other of the inputs of said second discriminator, means coupling the output of said second discriminator to a frequency-controlling device for said third oscillator, whereby said third oscillator is locked to a frequency harmonically related to that of said second oscillator, means coupled to said third oscillator for feeding a wave representative of the output of said third oscillator into the last mixer, and means for utilizing the output of said last mixer as a wave representative of the output of said multichannel oscillator.

3. In a frequency control system for a multichannel oscillator, a single stable frequency source providing a plurality of reference frequency waves, *n* mixers arranged in cascade, where *n* is more than 1, means feeding a sample of the wave output of said oscillator into the first of said mixers, (*n*—1) means for feeding a reference frequency wave harmonically related to a respective one of said first-mentioned waves into each respective mixer save the last, means feeding the output of each respective mixer save the last to the input of the next successive mixer, a second oscillator, a pulse generator coupled to the output of said second oscillator for developing from such output a series of pulses having a recurrence frequency equal to the frequency of the second oscillator output, a first phase discriminator having two inputs and an output, means coupling the output of said pulse generator to one of said two inputs, means for applying one of said reference frequency waves to the other of said two inputs, means coupling the output of said first discriminator to a frequency-controlling device for said second oscillator, whereby said second oscillator is locked to a frequency which is a submultiple of that of said last-mentioned one reference frequency wave, a third oscillator, a second phase discriminator having two inputs and an output, means coupling the output of said pulse generator to one of the inputs of said second discriminator, means coupling the output of said third oscillator to the other of the inputs of said second discriminator, means coupling the output of said discriminator to a frequency-controlling device for said third oscillator, whereby said third oscillator is locked to a frequency which is a multiple of that of said second oscillator, means coupled to said third oscillator for feeding a wave representative of the output of said third oscillator into the last mixer, and means for utilizing the output of said last mixer as a wave representative of the output of said multichannel oscillator.

4. In a frequency control system for a captive oscillator, a source of a wave of reference frequency, a second oscillator, a pulse generator coupled to the output of said second oscillator for developing from such output a series of pulses having a recurrence frequency equal to the frequency of the second oscillator output, a first phase discriminator having two inputs and an output, means coupling the output of said pulse generator to one of said two inputs, means for applying said wave to the other of said two inputs, means coupling the output of said first discriminator to a frequency-controlling device for said second oscillator, whereby said second oscillator is locked to a frequency which is a submultiple of that of said wave, a third oscillator, a second phase discriminator having two inputs and an output, means coupling the output of said pulse generator to one of the inputs of said second discriminator, means coupling the output of said third oscillator to the other of the inputs of said second discriminator, and means coupling the output of said second discriminator to a frequency-controlling device for said third oscillator, whereby said third oscillator is locked to a frequency which is a multiple of that of said second oscillator.

5. In a frequency control system for a multichannel oscillator, a single stable frequency source providing a plurality of reference frequency waves, *n* mixers arranged in cascade, wherein *n* is more than one, means feeding a sample of the wave output of said oscillator into the first of said mixers, $(n-1)$ means for feeding a reference frequency wave harmonically related to a respective one of said first-mentioned waves into each respective mixer save the last, means feeding the output of each respective mixer save the last to the input of the next successive mixer, a second oscillator for producing a first wave whose frequency is harmonically related to one of said reference frequency waves, an automatic phase control loop including a phase discriminator and a frequency control device for phase locking said second oscillator in harmonic relation with said last-mentioned one reference frequency wave; a third oscillator phase locked to the output of said second oscillator for producing a second wave whose frequency is harmonically related to that of said first wave, means for heterodyning the output of said third oscillator with a wave derived from one of said reference frequency waves to produce an altered frequency wave, means for feeding said altered frequency wave into the last mixer, and means for utilizing the output of said last mixer as a wave representative of the output of said multichannel oscillator.

6. A frequency control system for a multichannel oscillator, a single stable frequency source providing a plurality of reference frequency waves, *n* mixers arranged in cascade, wherein *n* is more than one, means feeding a sample of the wave output of said oscillator into the first of said mixers, $(n-1)$ means for feeding a reference frequency wave harmonically related to a respective one of said first-mentioned waves into each respective mixer save the last, means feeding the output of each respective mixer save the last to the input of the next successive mixer, a second oscillator for producing a first wave whose frequency is a submultiple of one of said reference frequency waves, an automatic phase control loop including a phase discriminator and a frequency control device for phase locking said second oscillator as a subharmonic of said last-mentioned one reference frequency wave; a third oscillator phase locked to the output of said second oscillator for producing a second wave whose frequency is a multiple of that of said first wave, means for heterodyning the output of said third oscillator with a wave derived from one of said reference frequency waves to produce an altered frequency wave, means for feeding said altered frequency wave into the last mixer, and means for utilizing the output of said last mixer as a wave representative of the output of said multichannel oscillator.

7. In a frequency control system for a multichannel oscillator, a single stable frequency source providing a plurality of reference frequency waves, *n* mixers arranged in cascade, wherein *n* is more than one, means feeding a sample of the wave output of said oscillator into the first of said mixers, $(n-1)$ means for feeding a reference frequency wave harmonically related to a respective one of said first-mentioned waves into each respective mixer save the last, means feeding the output of each respective mixer save the last to the input of the next successive mixer, a second oscillator, means receptive of the output of said second oscillator for developing therefrom a series of pulses having a recurrence frequency equal to the frequency of the second oscillator output, an automatic phase control loop including a phase discriminator receptive of said pulses and of one of said reference frequency waves, and including also a frequency control device, for phase locking said second oscillator in harmonic relation with said last-mentioned one reference frequency wave; a third oscillator, means receptive of said pulses for locking said third oscillator to a frequency hormonically related to that of said second oscillator, means for heterodyning the output of said third oscillator with a wave derived from one of said reference frequency waves to produce an altered frequency wave, means for feeding said altered frequency wave into the last mixer, and means for utilizing the output of said last mixer as a wave representative of the output of said multichannel oscillator.

8. In a frequency control system for a multichannel oscillator, a single stable frequency source providing a plurality of reference frequency waves, *n* mixers arranged in cascade, wherein *n* is more than one, means feeding a sample of the wave output of said oscillator into the first of said mixers, $(n-1)$ means for feeding a reference frequency wave harmonically related to a respective one of said first-mentioned waves into each respective mixer save the last, means feeding the output of each respective mixer save the last to the input of the next successive mixer, a second oscillator, means receptive of the output of said second oscillator for developing therefrom a series of pulses having a recurrence frequency equal to the frequency of the second oscillator output, an automatic phase control loop including a phase discriminator receptive of said pulses and of one of said reference frequency waves, and including also a frequency control device, for phase locking said second oscillator as a subharmonic of said last-mentioned one reference frequency wave; a third oscillator, means receptive of said pulses for locking said third oscillator to a frequency which is a multiple of that of said second oscillator, means for heterodyning the output of said third oscillator with a wave derived from one of said reference frequency waves to produce an altered frequency wave, means for feeding said altered frequency wave into the last mixer, and means for utilizing the output of said last mixer as a wave representative of the output of said multichannel oscillator.

References Cited in the file of this patent

UNITED STATES PATENTS

| | | |
|---|---|---|
| 2,505,043 | Guanella | Apr. 25, 1950 |
| 2,581,594 | MacSorley | Jan. 8, 1952 |
| 2,648,006 | Marby | Aug. 4, 1953 |
| 2,761,065 | Robinson | Aug. 28, 1956 |
| 2,775,701 | Israel | Dec. 25, 1956 |